US008623565B2

(12) United States Patent
Das et al.

(10) Patent No.: US 8,623,565 B2
(45) Date of Patent: Jan. 7, 2014

(54) ASSEMBLY OF BIFURCATION AND TRIFURCATION BIPOLAR PLATE TO DESIGN FUEL CELL STACK

(76) Inventors: Susanta K. Das, Grand Blanc, MI (US); Jayesh Kavathe, Flint, MI (US); K. Joel Berry, Flint, MI (US)

( * ) Notice: Subject to any disclaimer, the term of this patent is extended or adjusted under 35 U.S.C. 154(b) by 393 days.

(21) Appl. No.: 12/783,099

(22) Filed: May 19, 2010

(65) Prior Publication Data
US 2010/0297516 A1 Nov. 25, 2010

Related U.S. Application Data

(60) Provisional application No. 61/179,801, filed on May 20, 2009.

(51) Int. Cl.
*H01M 8/04* (2006.01)

(52) U.S. Cl.
USPC ........... 429/434; 429/400; 429/401; 429/405; 429/452; 429/454; 429/455; 429/456; 429/457; 429/458; 429/459; 429/460; 429/461; 429/467; 429/468; 429/469; 429/470; 429/471; 429/479; 429/483; 429/484; 429/492; 429/502; 429/535

(58) Field of Classification Search
USPC ......... 429/434, 400, 428, 452, 467, 468, 471, 429/401, 469, 479, 483, 535, 492, 405, 454, 429/455–461, 168, 470, 484, 502
See application file for complete search history.

(56) References Cited

U.S. PATENT DOCUMENTS

| | | | |
|---|---|---|---|
| 6,844,101 B2 | 1/2005 | Lee et al. | |
| 6,936,369 B1 | 8/2005 | Komura et al. | |
| 6,951,698 B2 | 10/2005 | King | |
| 7,018,733 B2 | 3/2006 | Sugiura et al. | |
| 7,067,213 B2 | 6/2006 | Boff et al. | |
| 7,524,575 B2 | 4/2009 | Bai et al. | |
| 2002/0192531 A1 | 12/2002 | Zimmerman et al. | |
| 2003/0068541 A1* | 4/2003 | Sugiura et al. | 429/26 |
| 2003/0203260 A1* | 10/2003 | Lee | 429/26 |
| 2003/0215695 A1 | 11/2003 | Suzuki et al. | |
| 2004/0048141 A1* | 3/2004 | Blank et al. | 429/38 |
| 2005/0074872 A1 | 4/2005 | Furino et al. | |
| 2006/0134502 A1 | 6/2006 | Garceau | |
| 2007/0042257 A1 | 2/2007 | Chyou et al. | |

(Continued)

*Primary Examiner* — Jeffrey Wollschlager
*Assistant Examiner* — Stella Yi
(74) *Attorney, Agent, or Firm* — Dickinson Wright, PLLC

(57) ABSTRACT

A current producing cell has anode flow plates 22 and cathode flow plates 20. Each of the flow plates 20, 22 defines a membrane face 26, a collector face 24, and a center axis C perpendicular to the membrane face 26 and the collector face 24. Each of the collector faces 24 define a plurality of cooling channels 74, 76, 78 and a plurality of transport channels 62, 64. The cooling channels 74, 76, 78 of the cathode flow plates 20 extend radially relative to the center axis C thereof to overlap the transport channels 62, 64 of the anode flow plates 22. The cooling channels 74, 76, 78 of the anode flow plates 22 extend radially relative to the center axis C thereof to overlap the transport channels 62, 64 of the cathode flow plates 20 for providing cooling axially between the cooling channels 74, 76, 78 of the anode flow plate 22 to the transport channels 62, 64 of the cathode flow plate 20 and between the cooling channels 74, 76, 78 of the cathode flow plate 20 to the transport channels 62, 64 of the anode flow plate 22.

20 Claims, 3 Drawing Sheets

(56) References Cited

U.S. PATENT DOCUMENTS

| | | |
|---|---|---|
| 2007/0202383 A1 | 8/2007 | Goebel |
| 2007/0207363 A1 | 9/2007 | Chyou et al. |
| 2008/0254339 A1 | 10/2008 | Owejan et al. |
| 2008/0318115 A1 | 12/2008 | Wang et al. |
| 2009/0075154 A1 | 3/2009 | Madeleine et al. |
| 2009/0286133 A1 | 11/2009 | Trabold et al. |

* cited by examiner

US 8,623,565 B2

ASSEMBLY OF BIFURCATION AND TRIFURCATION BIPOLAR PLATE TO DESIGN FUEL CELL STACK

CROSS REFERENCE TO RELATED APPLICATION

This application claims the benefit of application Ser. No. 61/179,801 filed May 20, 2009.

BACKGROUND OF THE INVENTION

1. Field of the Invention
A fuel cell that produces electrical current.
2. Description of the Prior Art
Current producing fuel cells are well known in the prior art. U.S. Pat. No. 7,018,733 to Seguira, for example, discloses a cathode flow plate and an anode flow plate parallel to the cathode flow plate. Each of the flow plates defines a collector face and a membrane face. Each of the collector faces defines a plurality of cooling channels. Each of the membrane faces defines a plurality of active channels for presenting fluid for reaction. One of the collector face and the membrane face of each of the flow plates defines a plurality of transport channels for moving fluid to and from the active channels. Each of the flow plates defines a center axis extending centrally therethrough and perpendicular to the membrane face and the collector face.

SUMMARY OF THE INVENTION AND ADVANTAGES

The invention provides for the cooling channels of the cathode flow plates extending radially relative to the central axis thereof to overlap the transport channels of the anode flow plates and the cooling channels of the anode flow plates extending radially relative to the central axis thereof to overlap the transport channels of the cathode flow plates for providing cooling axially between the cooling channels of the anode flow plate to the transport channels of the cathode flow plate and between the cooling channels of the cathode flow plate to the transport channels of the anode flow plate.

ADVANTAGES OF THE INVENTION

The complementary arrangement of the channels of the subject invention improves the flow of fluids through the transport and active channels of both anode flow plates and cathode flow plates.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
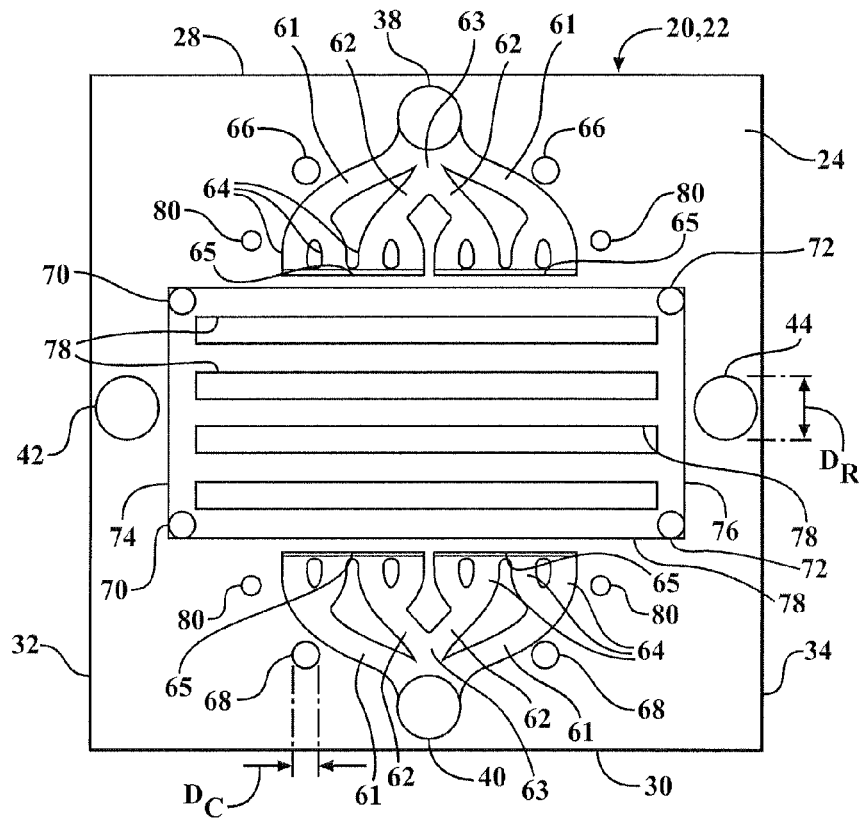
FIG. 1 is a front view of a flow plate according to the present invention.
Figure 2:
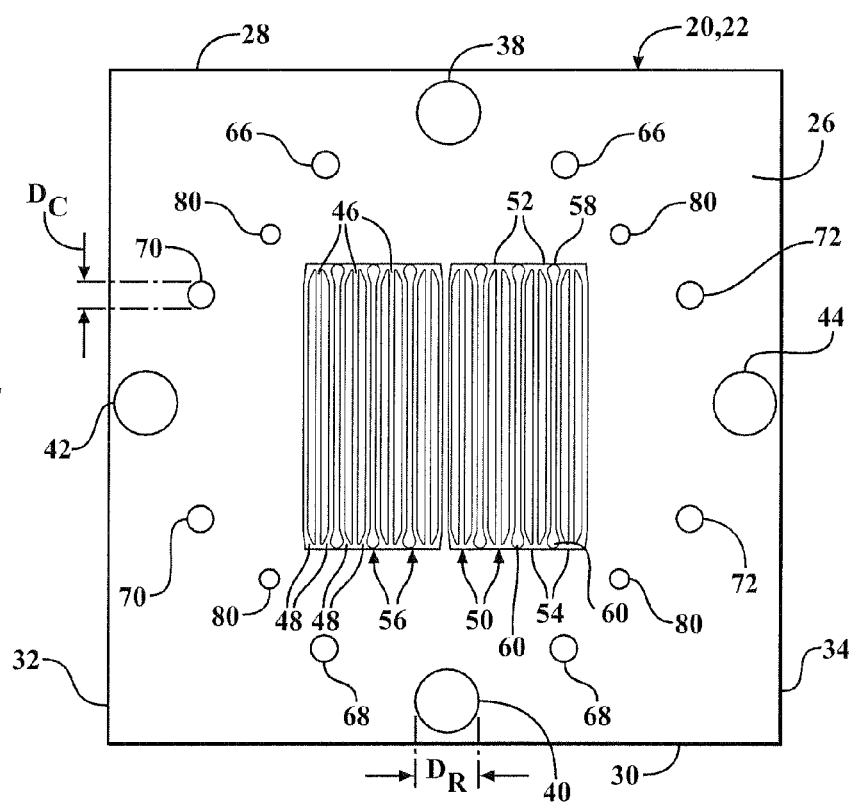
FIG. 2 is a rear view of a flow plate according to the present invention.
Figure 3:
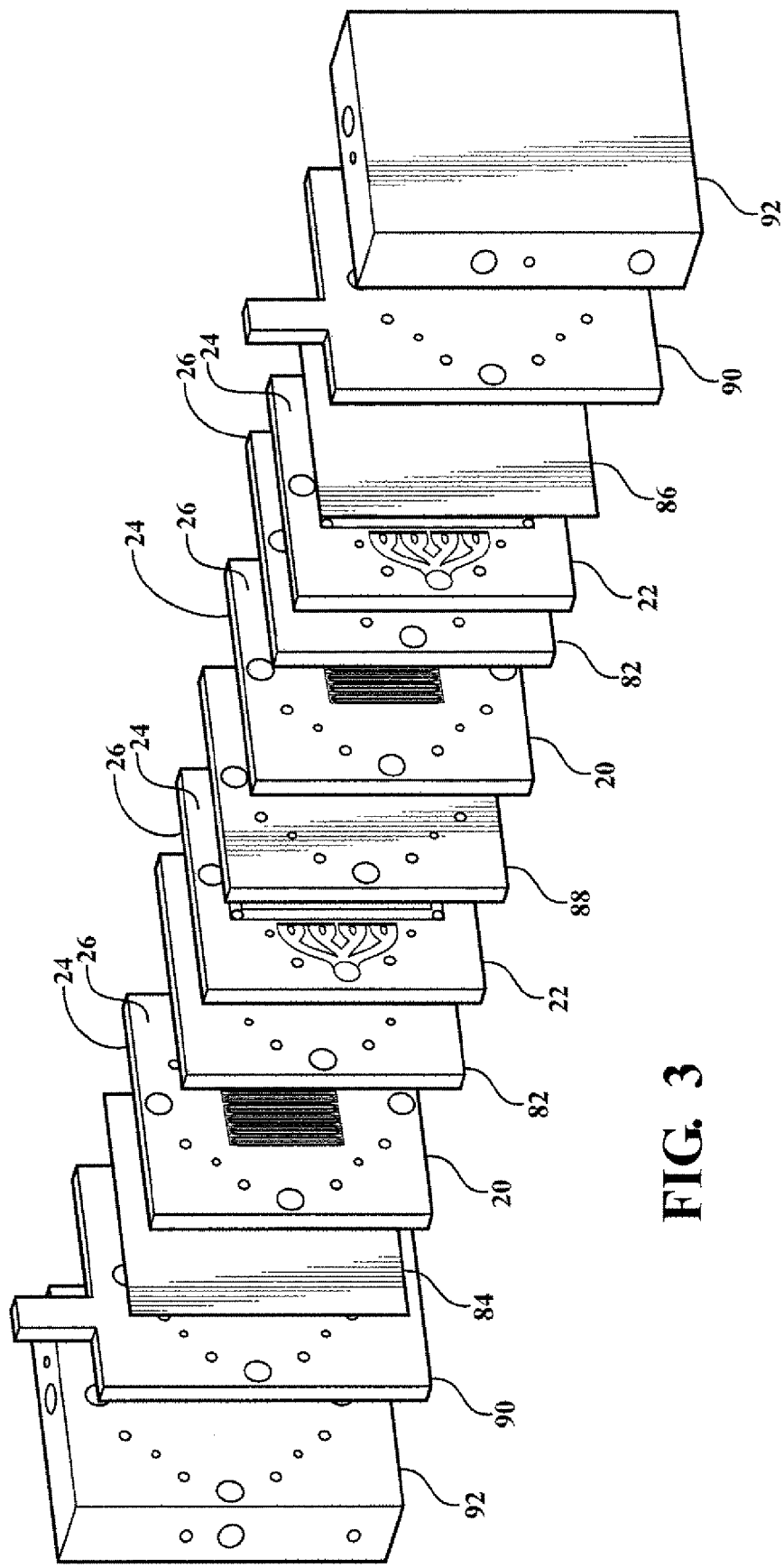
FIG. 3 is an exploded perspective view of a fuel cell that produces current according to the present invention.
Figure 4:
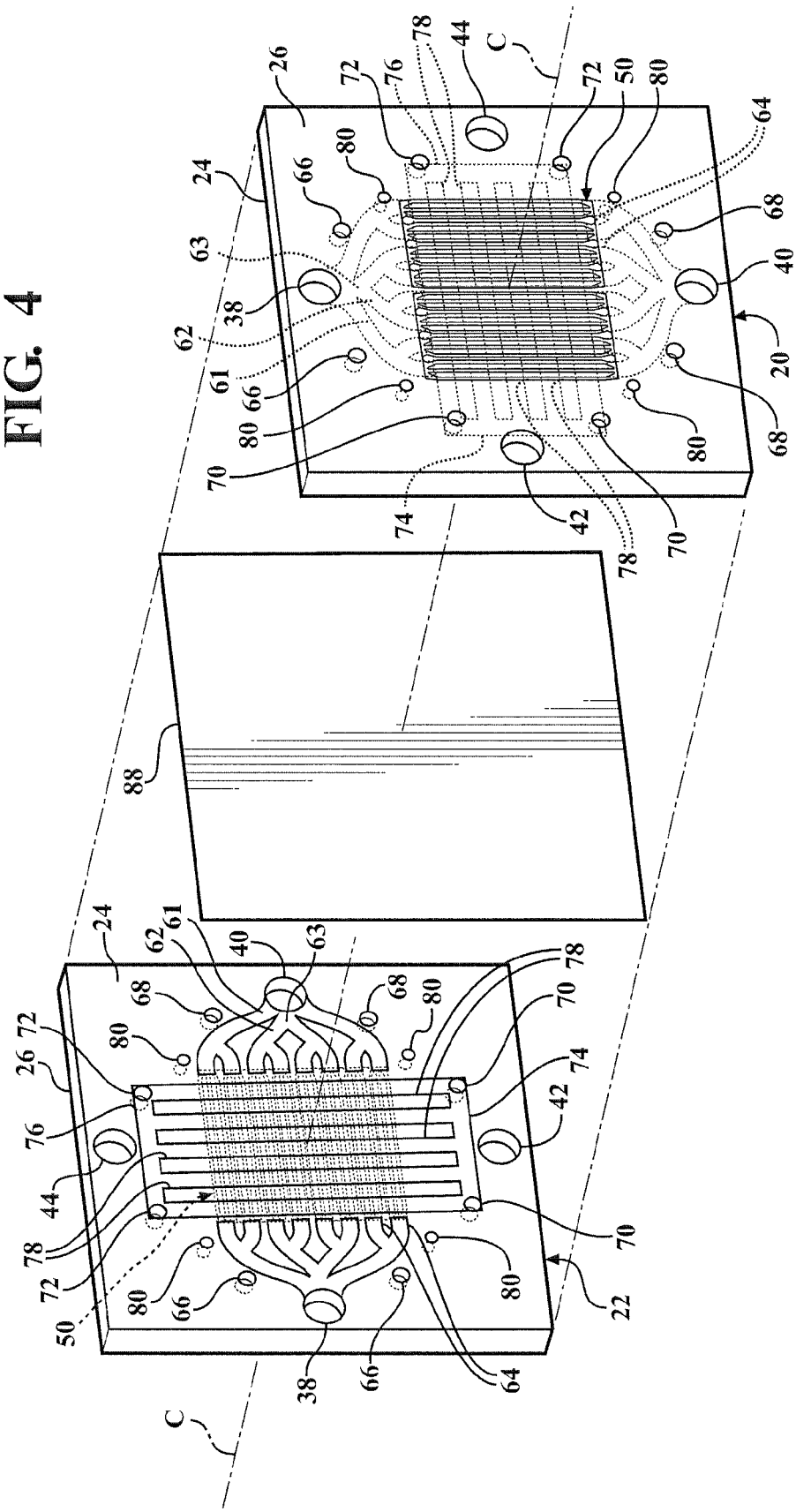
FIG. 4 is an exploded perspective view of two flow plates and a seal according to the present invention.

Referring to the Figures, wherein like numerals indicate corresponding parts throughout the several views, a fuel cell stack includes a plurality of flow plates 20, 22. Each of the flow plates 20, 22 defines a collector face 24 and a membrane face 26 parallel to the collector face 24. Each of the flow plates 20, 22 has an inlet edge 28 and an outlet edge 30 parallel to the inlet edge 28. The inlet edge 28 and the outlet edge 30 are interconnected by a first bypass edge 32 perpendicular to the inlet edge 28 and the outlet edge 30, and a second bypass edge 34 parallel to the first bypass edge 32 to define a square perimeter. Each of the flow plates 20, 22 define a center axis C extending centrally therethrough and perpendicular to the membrane face 26 and the collector face 24.

Each of the flow plates 20, 22 defines four reactant holes 44, 38, 40, 42 extending therethrough perpendicular to the membrane face 26 and the collector face 24. Each of the reactant holes 44, 38, 40, 42 has a reactant hole diameter $D_R$, and the reactant hole diameters $D_R$ are equal. Each of the reactant holes 44, 38, 40, 42 are radially spaced inwardly from a different one of the edges 28, 30, 32, 34 by an equal distance. The reactant holes 44, 38, 40, 42 include an inlet hole 38 adjacent and inward from the inlet edge 28 and midway between the first bypass edge 32 and the second bypass edge 34. The reactant holes 44, 38, 40, 42 include an outlet hole 40 radially opposite the inlet hole 38 and adjacent and inward from the outlet edge 30 and midway between the first bypass edge 32 and the second bypass edge 34. The reactant holes 44, 38, 40, 42 include a first bypass hole 42 adjacent and inward from the first bypass edge 32 and midway between the inlet edge 28 and the outlet edge 30 and disposed ninety degrees from the inlet hole 38 about the center axis C. The reactant holes 44, 38, 40, 42 including a second bypass hole 44 radially opposite the first bypass hole 42 and adjacent and inward from the second bypass edge 34 and midway between the inlet edge 28 and the outlet edge 30.

The membrane face 26 of each of the flow plates 20, 22 defines a plurality of active channels 46, 48 extending into the membrane face 26 for presenting fluid for reaction. The active channels 46, 48 are divided into channel sets 50. Each of the channel sets 50 include an inlet-side manifold 52 and an outlet-side manifold 54 and three of the active channels 46, 48 interconnecting the manifolds 52, 54. Each of the channel sets 50 include a middle active channel 46 extending perpendicular to the inlet edge 28. The three active channels 46, 48 of each channel set 50 include a pair of diverging active channels 48 disposed adjacent the middle active channel 46 and diverging in opposite directions from the middle active channel 46 and the inlet-side manifold 52 and then parallel with the middle active channel 46 and converging into the outlet-side manifold 54 with the middle active channel 46.

The membrane face 26 of each of the flow plates 20, 22 presents a plurality of ribs 56 each disposed between two adjacent of the channel sets 50. Each rib 56 defines an inlet head 58 and an outlet head 60, each being bulbous and interconnected by a straight section parallel to the first bypass edge 32.

Each of the flow plates 20, 22 defines a first plurality of transport channels including four branches 61, 62 and eight sub-branches 64 for moving fluid to the inlet-side manifolds 52 of the channel sets 50 from the inlet hole 38. The inlet hole (38) of each of the flows plates (20, 22) is trifurcated into a pair of outer branches (61) and one stem (63). The one stem (63) is disposed between the pair of outer branches (61) and is bifurcated into two inner branches (62). Each of the branches (61, 62) extending from the inlet hole (38) is bifurcated into a pair of the sub-branches (64). Each of the flow plates 20, 22 defines a second plurality of transport channels including four of the branches 61, 62 and eight of the sub-branches 64 for moving fluid from the outlet-side manifolds 54 of the channel sets 50 to the outlet hole 40. The outlet hole (40) of each of the flow plates (20, 22) is trifurcated into a pair of outer branches (61) and one stem (63). The one stem (63) is disposed between the pair of outer branches (61) and is bifurcated into two inner branches (62). Each of the branches (61, 62) extending from the outlet hole (40) is bifurcated into a pair of the sub-branches (64). Each of the branches 61, 62 extends from one of the inlet hole 38 and the outlet hole 40 and is in fluid communication with two of the sub-branches 64. Each of the sub-branches 64 in fluid communication with one of the manifolds 52, 54 of one of the channel sets 50 of the flow plate 20, 22 thereof. The inner branches 62 have a combined minimal cross-sectional flow area that is less than the combined minimal cross-sectional flow area of the outer branches 61.

Each of the flow plates 20, 22 define a plurality of slots 65 each interconnecting adjacent of the sub-branches 64. One of the slots 65 is adjacent each of the heads 58, 60.

Each of the flow plates 20, 22 defines a plurality of coolant holes 68, 70, 72, 66 extending therethrough perpendicular to the membrane and collector faces 26, 24 and having coolant hole diameters $D_C$ being equal. The coolant holes 68, 70, 72, 66 include two inlet-side coolant holes 66 inward from and on either side of the inlet hole 38 and two outlet-side coolant holes 68 inward from and on either side of the outlet hole 40 and two first bypass-side coolant holes 70 inward from and on either side of the first bypass hole 42 and two second bypass-side coolant holes 72 inward from and on either side of the second bypass hole 44.

Each of the collector faces 24 defines a plurality of cooling channels 74, 76, 78. The cooling channels 74, 76, 78 include a first bypass-side cooling channel 74 extending between the first bypass-side coolant holes 70 and parallel to the first bypass edge 32. The cooling channels 74, 76, 78 include a second bypass-side cooling channel 76 extending between the second bypass-side coolant holes 72 and parallel to the first bypass-side cooling channel 74. The cooling channels 74, 76, 78 include a plurality of transverse cooling channels 78 extending perpendicular to and between the first bypass-side cooling channel 74 and the second bypass-side cooling channel 76.

Each of the flow plates 20, 22 define a plurality of alignment holes 80 extending therethrough perpendicular to the collector face 24 and the membrane face 26 thereof. One of the alignment holes 80 is between the inlet hole 38 and the second bypass hole 44. Another of the alignment holes 80 is between the second bypass hole 44 and the outlet hole 40. Another of the alignment holes 80 is between the outlet hole 40 and the first bypass hole 42. Another of the alignment holes 80 is between the first bypass hole 42 and the inlet hole 38.

The flow plates 20, 22 include a plurality of cathode flow plates 20 each having the membrane face 26 thereof facing a common direction and the center axes C thereof being coaxial. Each of the cathode flow plates 20 is disposed one of ninety degrees and one hundred eighty degrees from each other of the cathode flow plates 20 about the center axis C.

The flow plates 20, 22 include a plurality of anode flow plates 22 each having the membrane face 26 thereof facing in the opposite direction as the membrane face 26 of each of the cathode flow plates 20 and the center axes C thereof being coaxial.

Each of the anode flow plates 22 is disposed one of ninety degrees and two-hundred seventy degrees from each of the cathode flow plates 20 to align the inlet hole 38 of each of the anode flow plates 22 with one of the first bypass hole 42 and the second bypass hole 44 of each of the cathode flow plates 20 and align the first bypass hole 42 of each of the anode flow plates 22 with one of the outlet hole 40 and inlet hole 38 of each of the cathode flow plates 20 and align the outlet hole 40 of each of the anode flow plates 22 with one of the second bypass holes 44 and first bypass holes 42 of each of the cathode flow plates 20 and align the second bypass hole 44 of each of the anode flow plates 22 with one of the inlet hole 38 and outlet hole 40 of each of the cathode flow plates 20 and align each of the coolant holes 68, 70, 72, 66 of each of the cathode flow plates 20 with one of the coolant holes 68, 70, 72, 66 of each of the anode flow plates 22 and align each of the alignment holes 80 of each of the cathode flow plates 20 with one of the alignment holes 80 of each of the anode flow plates 22.

A plurality of membrane electrode assemblies 82 for collecting and conducting protons therethrough each present an anode face being clamped against the membrane face 26 of one of the anode flow plates 22. Each of the membrane electrode assemblies 82 present a cathode face opposite and parallel the anode face and clamped against the membrane face 26 of one of the cathode flow plates 20.

A plurality of seals 84, 86, 88 each for conducting electricity and preventing migration of fluid therethrough include a cathode end seal 84 being disposed against the collector face 24 of one the cathode flow plates 20. The seals 84, 86, 88 include an anode end seal 86 being disposed against the collector face 24 of one of the anode flow plates 22. The seals 84, 86, 88 include a plurality of intermediate seals 88 each being disposed against the collector face 24 of one the cathode flow plates 20 and the collector face 24 of one the anode plate.

A pair of collector plates 90 each abuts one of the end seals 84, 86. A pair of end plates 92 each abuts one of the collector plates 90.

The cooling channels 74, 76, 78 of the cathode flow plates 20 extend radially relative to the center axis C thereof to overlap the branches 61, 62, and sub-branches 64 of the anode flow plates 22 and the cooling channels 74, 76, 78 of the anode flow plates 22 extend radially relative to the center axis C thereof to overlap the branches 61, 62, and sub-branches 64 of the cathode flow plates 20 for providing cooling axially between the cooling channels 74, 76, 78 of the anode flow plate 22 to the branches 61, 62, and sub-branches 64 of the cathode flow plates 20 and between the cooling channels 74, 76, 78 of the cathode flow plate 20 to the branches 61, 62, and sub-branches 64 of the anode flow plate 22.

In an embodiment of the invention, the inlet holes 38 of each of the cathode flow plates 20 are coaxial, and the inlet holes 38 of each of the anode flow plates 22 are coaxial and disposed ninety degrees from the inlet holes 38 of the cathode flow plates 20 about the center axes C to align the inlet hole 38 of each of the anode flow plates 22 with the first bypass hole 42 of each of the cathode flow plates 20 and align the first bypass hole 42 of each of the anode flow plates 22 with the outlet hole 40 of each of the cathode flow plates 20 and align the outlet hole 40 of each of the anode flow plates 22 with the second bypass holes 44 of each of the cathode flow plates 20 and align the second bypass hole 44 of each of the anode flow plates 22 with the inlet hole 38 of each of the cathode flow plates 20 for parallel distribution of fluid to the active channels 46, 48 of the flow plates 20, 22.

In another embodiment, the inlet holes 38 of each of the cathode flow plates 20 are coaxial with every other one of the other of the cathode flow plates 20, and the inlet holes 38 of each of the anode flow plates 22 is coaxial with every other one of the other of the flow plates 20, 22 for series of distribution of fluid to the active channels 46, 48 of the flow plates 20, 22.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A fuel cell stack comprising:
   at least one cathode flow plate (20) and at least one anode flow plate (22) parallel to said at least one cathode flow plate (20),
   each of said flow plates (20, 22) presenting a collector face (24) and a membrane face (26) parallel to and facing opposite said collector face (24),
   each of said flow plates (20, 22) defining an inlet hole (38) and an outlet hole (40) each extending perpendicular to said membrane face (26) and said collector face (24) for distributing and collecting fluid,
   said collector face (24) of each of said flow plates (20, 22) defining outer branches (61) and inner branches (62) and stems (63) and sub-branches (64) for conveying fluid
   said inlet hole (38) of each of said flow plates (20, 22) being trifurcated into a pair of said outer branches (61) and one of said stems (63), wherein said one stem (63) is disposed between said pair of outer branches (61), said one stem (63) is bifurcated into two of said inner branches (62), and each of said branches (61, 62) extending from said inlet hole (38) is bifurcated into a pair of said sub-branches (64),
   said outlet hole (40) of each of said flow plates (20, 22) being trifurcated into a pair of said outer branches (61) and one of said stems (63), wherein said one stem (63) is disposed between said pair of outer branches (61), said one stem (63) is bifurcated into two of said inner branches (62), and each of said branches (61, 62) extending from said outlet hole (40) is bifurcated into a pair of said sub-branches (64),
   said membrane face (26) of each of said flow plates (20, 22) defining a plurality of inlet-side manifolds (52), wherein each one of said inlet-side manifolds (52) is disposed along and in fluid communication with one of said sub-branches (64) extending from said inlet hole (38),
   said membrane face (26) of each of said flow plates (20, 22) defining a plurality of outlet-side manifolds (54), wherein each one of said outlet-side manifolds (54) is disposed along and in fluid communication with one of said sub-branches (64) extending from said outlet hole (40),
   said membrane face (26) of each of said flow plates (20, 22) defining a plurality of active channels (46, 48) interconnecting said inlet-side manifolds (52) and said outlet-side manifolds (54), wherein each one of said inlet-side manifolds (52) is trifurcated into three of said active channels (46, 48), and said three active channels (46, 48) interconnect said inlet-side manifold (52) with one of said outlet-side manifolds (52).

2. A fuel cell stack as set forth in claim 1 wherein said inner branches (62) have a combined minimal cross-sectional flow area less than the combined minimal cross-sectional flow area of said outer branches (61).

3. A fuel cell stack at set forth in claim 1 including a plurality of said cathode flow plates (20) and a plurality of said anode flow plates (22) and wherein
   each of said collector faces (24) defines a plurality of cooling channels (74, 76, 78),
   each of said flow plates (20, 22) defines a center axis (C) extending centrally therethrough and perpendicular to said membrane face (26) and said collector face (24),
   each of said membrane faces (26) of said cathode flow plates (20) axially faces a common direction and each of said membrane faces (26) of said anode flow plates (22) axially faces in the opposite direction as said membrane faces (26) of each of said cathode flow plates (20),
   each of said flow plates (20, 22) defines a plurality of reactants holes (44, 38, 40, 42) extending therethrough perpendicular to said membrane faces (26) and said collector faces (24) and disposed radially outward of said active channels (46, 48) for fluid communication between said cathode flow plates (20) and independent fluid communication between said anode flow plates (22), and
   said cooling channels (74, 76, 78) of said cathode flow plates (20) extends transversely relative to said center axis (C) thereof and at a first direction beyond said active channels (46, 48) of said cathode flow plate (20) and said active channels (46, 48) of said anode flow plates (22) to overlap said transport channels branches (61, 62) and sub-branches (64) of said anode flow plates (22) and said cooling channels (74, 76, 78) of said anode flow plates (22) extending transversely relative to said center axis (C) thereof and at a second direction approximately ninety degrees from said first direction beyond said active channels (46, 48) of said anode flow plate (22) and said active channels (46, 48) of said cathode flow plate (20) to overlap said branches (61, 62) and sub-branches (64) of said cathode flow plates (20) for providing cooling axially between said cooling channels (74, 76, 78) of said anode flow plate (22) to said branches (61, 62) and sub-branches (64) of said cathode flow plate (20) and between said cooling channels (74, 76, 78) of said cathode flow plate (20) to said branches (61, 62) and sub-branches (64) of said anode flow plate (22).

4. A fuel cell stack as set forth in claim 1 wherein said center axis (C) of each of said anode flow plates (22) and cathode flow plates (20) are coaxial.

5. A fuel cell stack as set forth in claim 4 wherein each of said anode flow plates (22) is disposed one of one-hundred eighty degrees and zero degrees from each other about said center axis (C) and one of ninety degrees and two-hundred seventy degrees from each of said cathode flow plates (20) about said center axis (C).

6. A fuel cell stack as set forth in claim 1 wherein said reactant holes (44, 38, 40, 42) include an inlet hole (38) and an outlet hole (40) radially opposite said inlet hole (38) thereof and a first bypass hole (42) ninety degrees from said inlet hole (38) thereof about said center axis (C) thereof and a second bypass hole (44) radially opposite said first bypass hole (42) thereof.

7. A fuel cell stack as set forth in claim 6 wherein said inlet hole (38) of each of said anode flow plates (22) is aligned with one of said first bypass hole (42) and said second bypass hole (44) of each of said cathode flow plates (20) and said first bypass hole (42) of each of said anode flow plates (22) is aligned with one of said outlet hole (40) and inlet hole (38) of each of said cathode flow plates (20) and said outlet hole (40) of each of said anode flow plates (22) is aligned with one of said second bypass holes (44) and first bypass holes (42) of each of said cathode flow plates (20) and said second bypass hole (44) of each of said anode flow plates (22) is aligned with one of said inlet hole (38) and outlet hole (40) of each of said cathode flow plates (20).

8. A fuel cell stack as set forth in claim 7 wherein said inlet holes (38) of each of said cathode flow plates (20) are coaxial and said inlet holes (38) of each of said anode flow plates (22) are coaxial and ninety degrees from said inlet holes (38) of said cathode flow plates (20) about said center axis (C) to align said inlet hole (38) of each of said anode flow plates (22) with said first bypass hole (42) of each of said cathode flow plates (20) and align said first bypass hole (42) of each of said anode flow plates (22) with said outlet hole (40) of each of said cathode flow plates (20) and align said outlet hole (40) of each of said anode flow plates (22) with said second bypass holes (44) of each of said cathode flow plates (20) and align said second bypass hole (44) of each of said anode flow plates (22) with said inlet hole (38) of each of said cathode flow plates (20) for parallel distribution of fluid to said flow plates (20, 22).

9. A fuel cell stack as set forth in claim 7 wherein said inlet holes (38) of each of said cathode flow plates (20) are coaxial with every other one of the other of said cathode flow plates (20) and said inlet holes (38) of each of said anode flow plates (22) being coaxial with every other one of the other of said flow plates (20, 22) for series of distribution of fluid to said active channels (46, 48) of said flow plates (20, 22).

10. A fuel cell stack as set forth in claim 6 wherein each of said flow plates (20, 22) defines a plurality of coolant holes (68, 70, 72, 66) extending therethrough perpendicular to said membrane face (26) and collector face (24) thereof and having coolant hole diameters (DC) being equal and said coolant holes (68, 70, 72, 66) including two inlet-side coolant holes (66) inward from and on either side of said inlet hole (38) and a pair of outlet-side coolant holes (68) inward from and on either side of said outlet hole (40) and two first bypass-side coolant holes (70) inward from and on either side of said first bypass hole (42) and two second bypass-side coolant holes (72) inward from and on either side of said second bypass hole (44) and each of said coolant holes (68, 70, 72, 66) of each of said cathode flow plates (20) in alignment with one of said coolant holes (68, 70, 72, 66) of each of said anode flow plates (22).

11. A fuel cell stack as set forth in claim 10 wherein said cooling channels (74, 76, 78) include a first bypass-side cooling channel (74) extending between said first bypass-side coolant holes (70) and said cooling channels (74, 76, 78) include a second bypass-side cooling channel (76) extending between said second bypass-side coolant holes (72) and parallel to said first bypass-side cooling channel (74) and said cooling channels (74, 76, 78) include a plurality of transverse cooling channels (78) extending perpendicular to and between said first bypass-side cooling channel (74) and said second bypass-side cooling channel (76).

12. A fuel cell stack as set forth in claim 6 wherein each of said flow plates (20, 22) defines a plurality of alignment holes (80) extending therethrough perpendicular to said collector face (24) and said membrane face (26) thereof and one of said alignment holes (80) being between said inlet hole (38) and said second bypass hole (44) and one other of said alignment holes (80) being between said second bypass hole (44) and said outlet hole (40) and one other of said alignment holes (80) being between said outlet hole (40) and said first bypass hole (42) and a one other of said alignment holes (80) being between said first bypass hole (42) and said inlet hole (38) and each of said alignment holes (80) of each of said cathode flow plates (20) is in alignment with one of said alignment holes (80) of each of said anode flow plates (22).

13. A fuel cell stack as set forth in claim 1 including a plurality of said cathode flow plates (20) and a plurality of said anode flow plates (22) wherein a plurality of membrane electrode assemblies (82) for collecting and conducting protons therethrough each present an anode face being clamped against said membrane face (26) of one of said anode flow plates (22) and a cathode face opposite and parallel said anode face and being clamped against said membrane face (26) of one of said cathode flow plates (20).

14. A fuel cell stack as set forth in claim 1 including a plurality of said cathode flow plates (20) and a plurality of said anode flow plates (22) wherein a plurality of seals (84, 86, 88) each for conducting electricity and preventing migration of fluid therethrough include a cathode end seal (84) being disposed against said collector face (24) of one said cathode flow plates (20) and an anode end seal (86) being disposed against said collector face (24) of one of said anode flow plates (22) and a plurality of intermediate seals (88) each being disposed against said collector face (24) of one said cathode flow plates (20) and said collector face (24) of one said anode flow plates (22).

15. A fuel cell stack as set forth in claim 14 wherein a pair of collector plates (90) each abut one of said end seals (84, 86) and a pair of end plates (92) each abutting one of said collector plates (90).

16. A fuel cell stack as set forth in claim 1 wherein said three active channels (46, 48) include a middle active channel (46) and a pair of diverging active channels (48) disposed adjacent said middle active channel (46) and diverging in opposite directions from said middle active channel (46) and then parallel with said middle active channel (46) and converging into said outlet-side manifold (54) with said middle active channel (46).

17. A fuel cell stack as set forth in claim 16 wherein said membrane face (26) of each of said flow plates (20, 22) presents a plurality of ribs (56) each disposed between two adjacent of said channel sets (50) with each rib (56) defining an inlet head (58) and an outlet head (60) and each of said heads (58, 60) being bulbous and interconnected by a straight section.

18. A fuel cell stack as set forth in claim 1 wherein each of said branches (61, 62) extends from one of said one inlet hole (38) and said outlet hole (40) and is in fluid communication with two of said sub-branches (64) and each of said sub-branches (64) is in fluid communication with one of said manifolds (52, 54).

19. A fuel cell stack as set forth in claim 18 wherein each of said flow plates (20, 22) define a plurality of slots (65) each interconnecting adjacent of said sub-branches (64) and one of said slots (65) is adjacent each of said heads (58, 60).

20. A fuel cell stack as set forth in claim 1 wherein each of said flow plates (20, 22) have an inlet edge (28) and an outlet edge (30) parallel to said inlet edge (28) and interconnected by a first bypass edge (32) perpendicular to said inlet edge (28) and said outlet edge (30) and a second bypass edge (34) parallel to said first bypass edge (32) to define a square perimeter and each of said reactant holes having reactant hole diameter (DR) being equal and each being radially spaced inwardly from a different one of said edges (28, 30, 32, 34) by an equal distance and said inlet hole (38) is adjacent and inward from said inlet edge (28) and midway between said first bypass edge (32) and said second bypass edge (34) and said outlet hole (40) is inward from said outlet edge (30) and midway between said first bypass edge (32) and said second bypass edge (34) and said first bypass hole (42) is adjacent and inward from said first bypass edge (32) and midway between said inlet edge (28) and said outlet edge (30) and said second bypass hole (44) is adjacent and inward from said second bypass edge (34) and midway between said inlet edge (28) and said outlet edge (30).

* * * * *

UNITED STATES PATENT AND TRADEMARK OFFICE
CERTIFICATE OF CORRECTION

PATENT NO. : 8,623,565 B2
APPLICATION NO. : 12/783099
DATED : January 7, 2014
INVENTOR(S) : Das et al.

Page 1 of 1

It is certified that error appears in the above-identified patent and that said Letters Patent is hereby corrected as shown below:

In the Claims

Column 6, Claim 3, line 22, "transport channels" should be deleted.

Signed and Sealed this
Twenty-fourth Day of June, 2014

Michelle K. Lee
*Deputy Director of the United States Patent and Trademark Office*